United States Patent
Esman

(10) Patent No.: US 10,768,370 B1
(45) Date of Patent: Sep. 8, 2020

(54) PHOTONIC N-TO-ONE SINGLE-MODE COMBINER

(71) Applicant: Rockwell Collins, Inc., Cedar Rapids, IA (US)

(72) Inventor: Ronald D. Esman, McLean, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/577,721

(22) Filed: Sep. 20, 2019

(51) Int. Cl.
*G02B 6/028* (2006.01)
*G02B 6/14* (2006.01)
*H04J 14/04* (2006.01)

(52) U.S. Cl.
CPC ............ *G02B 6/14* (2013.01); *G02B 6/0288* (2013.01); *H04J 14/04* (2013.01)

(58) Field of Classification Search
CPC .......... G02B 6/14; G02B 6/0288; H04J 14/04
USPC .......................................................... 385/28
See application file for complete search history.

(56) References Cited

U.S. PATENT DOCUMENTS

| | | | |
|---|---|---|---|
| 9,411,100 B2 | 8/2016 | Fontaine et al. | |
| 9,664,850 B2 | 5/2017 | Fontaine et al. | |
| 9,787,401 B2 * | 10/2017 | Chang | H04B 10/27 |
| 10,330,525 B2 | 6/2019 | Galtarossa et al. | |
| 2007/0134006 A1 * | 6/2007 | Krieg | G02F 1/0123 |
| | | | 398/198 |
| 2016/0285579 A1 * | 9/2016 | Li | H04J 14/02 |
| | | | 14/2 |
| 2016/0357086 A1 * | 12/2016 | Jewart | G02B 6/125 |
| 2017/0299900 A1 | 10/2017 | Montoya et al. | |

FOREIGN PATENT DOCUMENTS

EP 2823580 B1 6/2019

OTHER PUBLICATIONS

Birks, T. A. et al., "The Photonic Lantern", Advances in Optics and Photonics 7, pp. 107-167 (2015) doi:10.1364/AOP7.000107.
Chapman, David, "Low-Loss Many-to-One Fiber Couplers with Few or Single-Moded Inputs and a Multi-mode Output", Fiber and Integrated Optics, 23, pp. 375-385, 2004.
Fok, Mable P. et al., "Single beating elimination using single-mode fiber to multimode fiber coupling", Optics Letters, vol. 36, No. 23, Dec. 1, 2011, pp. 4578-4580.
Frankel, Michael Y. et al., "True Time-Delay Fiber-Optic Control of an Ultrawideband Array Transmitter/Receiver with Multibeam Capability", IEEE Transactions on Microwave Theory and Techniques, vol. 43, No. 9, Sep. 1995, pp. 2387-2394.

(Continued)

*Primary Examiner* — Sung H Pak
(74) *Attorney, Agent, or Firm* — Suiter Swantz pc llo

(57) ABSTRACT

A photonic N-to-one single-mode combiner is disclosed. In embodiments, the combiner receives multiple single-mode photonic inputs (e.g., via single-mode optical fibers) and combines the single-mode inputs into a multi-mode photonic output via photonic lantern. The multi-mode photonic output is converted via high-power, high-speed photodiode into an RF/electrical output which in turn drives an electro-optical modulator, modulating a second optical beam (e.g., a laser generated by a laser emitter of the combiner) to generate a single-mode photonic output signal.

15 Claims, 3 Drawing Sheets

(56) References Cited

OTHER PUBLICATIONS

Matthews, Paul J. et al., "A wide-band Fiber-optic True-Time-Steered Array Receiver Capable of Multiple Independent Simultaneous Beams", IEEE Photonics Technology Letters, vol. 10, No. 5, May 1998, pp. 722-724.

Dennis, Michael L., "Digital optical signal processing and wavelength conversion using high-current photoreceivers and low-voltage modulators", Cleo '98, Thursday, May 7, 1998, pp. 474-475.

\* cited by examiner ately, photonic inputs may be combined via a single-mode to multi-mode (SM/MM) combiner (SMC) and detected via commercial off the shelf (COTS) high speed detector designed for multimode optical fiber, but this approach similarly results in an output in the RF domain, rather than the single-mode optical domain.

SUMMARY

A photonic N-to-one (N:1) single-mode (SM) combiner is disclosed. In embodiments, the photonic N:1 SM combiner includes a photonic lantern configured for receiving a set of N SM photonic inputs via optical waveguides. The photonic lantern combines the N SM photonic inputs into a multi-mode (MM) photonic output. The photonic N:1 SM combiner includes a photodiode optically connected to the photonic lantern, the photodiode configured for receiving the MM photonic output and generating an RF output (e.g., electrical output) therefrom. The photonic N:1 SM combiner includes a laser emitter configured for generating a laser input (e.g., an alternative SM photonic input). The photonic N:1 SM combiner includes an electro-optical modulator (EOM) optically connected to the laser emitter and further connected to the photodiode; the RF/electrical output of the photodiode drives the EOM to modulate the laser input, generating a SM photonic output signal.

An S-stage cascading photonic single-mode (SM) combiner assembly is also disclosed. In embodiments, the S-stage cascading photonic single-mode (SM) combiner assembly incorporates a series of S combiner stages collectively generating a SM photonic output signal. Each combiner stage comprises a group of photonic SM combiners, each combiner receiving a group of SM photonic inputs and generating therefrom a SM photonic output. In particular, each photonic SM combiner includes a photonic lantern configured for receiving a set of SM photonic inputs via optical waveguides. The photonic lantern combines the SM photonic inputs into a multi-mode (MM) photonic output. Each photonic SM combiner includes a photodiode optically connected to the photonic lantern, the photodiode configured for receiving the MM photonic output and generating an RF output (e.g., electrical output) therefrom. Each photonic SM combiner includes a laser emitter configured for generating a laser input (e.g., an alternative SM photonic input). Each photonic SM combiner includes an electro-optical modulator (EOM) optically connected to the laser emitter and further connected to the photodiode; the RF/electrical output of the photodiode drives the EOM to modulate the laser input, generating an SM photonic output signal. At the final combiner stage, a single N:1 photonic SM combiner receives as input the set of N SM photonic outputs generated by the N photonic SM combiners of the penultimate or prior stage and generates the SM photonic output signal as the system output. Each prior combiner stage receives as input the SM photonic output signals of the photonic SM combiners of the preceding combiner stage and generates SM photonic output signals received as input by the photonic SM combiners of the next combiner stage.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
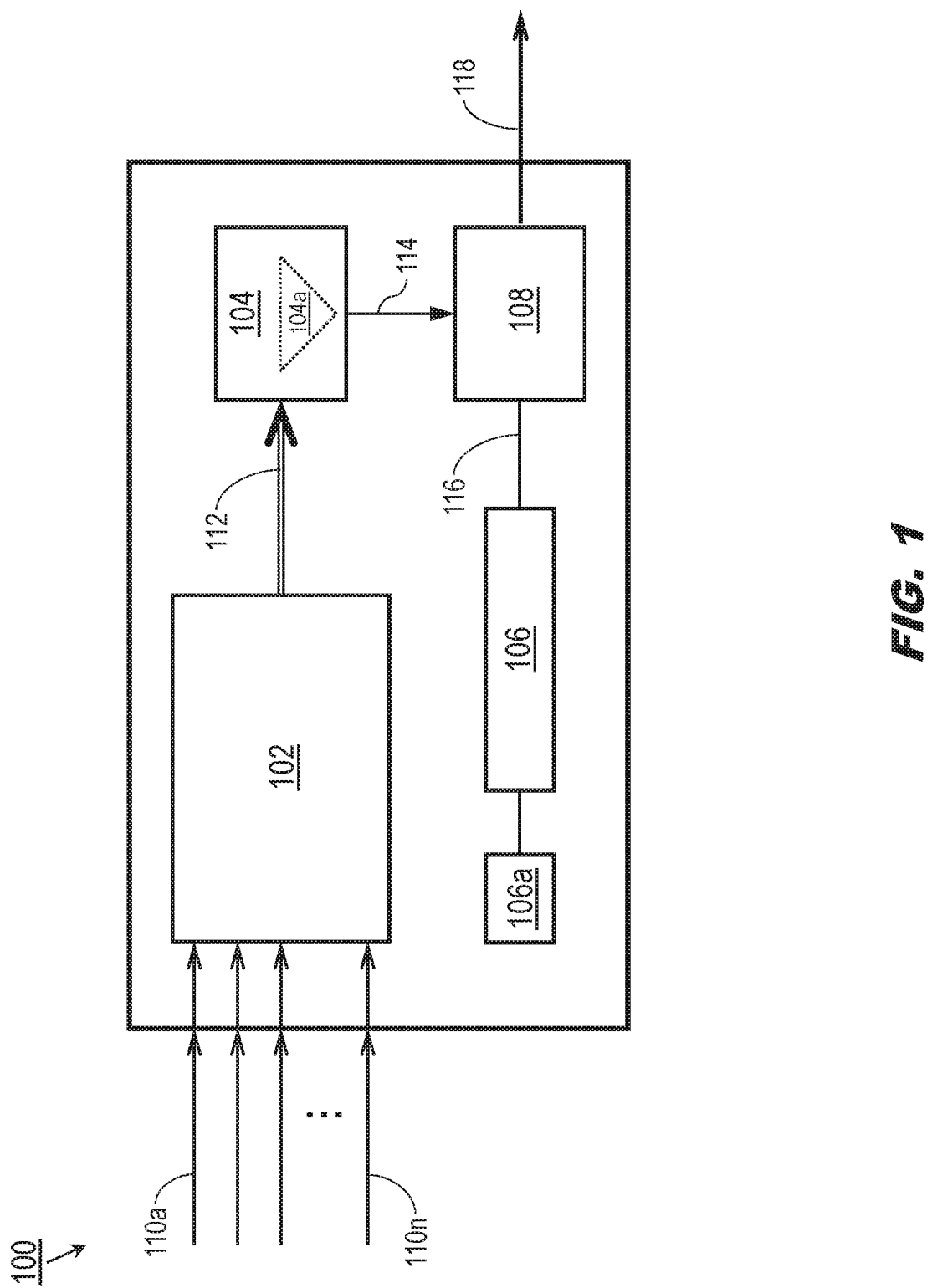
FIG. 1 is a block diagram illustrating a photonic N-to-one (N:1) single-mode (SM) combiner, in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a photonic N-to-one (N:1) single-mode (SM) combiner, which combines aspects of single-mode photonic signal combiners with those of an optical wavelength converter. The photonic SM combiner can combine multiple optical inputs into one single-mode optical output signal (e.g., combine N inputs into one output) without the need for noisy or lossy electronic amplifiers. A simple configuration incorporating few components of known reliability provides for superior performance at small size.

Referring to FIG. 1, a photonic N-to-one (N:1) single-mode (SM) combiner 100 is disclosed. The photonic N:1 SM combiner 100 may include a photonic lantern 102 (e.g., a single-mode/multi-mode (SM/MM) combiner), a high-power, high-speed photodiode 104 or like photodetector, a single-mode laser emitter 106 (e.g., or other like optical emitter capable of generating an SM optical beam) with control/power supply 106a, and an electro-optical modulator (EOM) 108.

In embodiments, the photonic lantern 102 may receive a number of single-mode photonic inputs 110a . . . 110n via optical input fibers (e.g., single-mode, polarization-maintaining, or few-mode fibers). The photonic lantern 102 may convert the SM photonic inputs into a single multi-mode (MM) photonic output 112. For example, the MM photonic output 112 may incorporate over 100 distinct SM photonic inputs. To maintain optimal efficiency and avoid interference noise, however, the diameter of the multi-mode fiber carrying the MM photonic output 112 is preferably not more than the diameter of the photodiode 104, the diameter of the photodiode often determined by the maximum frequency of interest. In some embodiments, the SM photonic inputs 110a-n carried by the optical input fibers may share a common wavelength (although it is not required that all SM photonic inputs 110a-n share a common wavelength).

In embodiments, the photodiode 104 is driven by the MM photonic output 112, generating an RF or electrical output 114 based on the MM photonic output. In some embodiments, the photonic N:1 SM combiner 100 may incorporate a photodetector including an RF amplifier (104a) to increase the power level of the RF output 114. Because the combined optical signal (from 110a . . . 110n) may yield a large optical power, the resulting photodetector output 114 may also be relatively large and may sufficiently drive the EOM 108 as described below. In this case, the required gain may be very low, which allows use of an RF amplifier 104a with, e.g., very low noise, high dynamic range, and low electrical power draw; alternatively, the RF amplifier may not be needed at all.

In embodiments, the photodetector output 114 may drive the EOM 108, which may be a low half-wave voltage ($V_\pi$) modulator capable of receiving from the laser emitter 106 a second SM photonic input 116 (e.g., as opposed to the first single-mode photonic inputs 110a-n received by the photonic lantern 102 via the optical input fibers 110a-n) of variable wavelength. The EOM 108 may be configured to support the necessary bandwidth (e.g., >10 GHz) associated with the first single-mode photonic inputs 110a-n. The laser emitter 106 may be a basic emitter such that the second single-mode photonic input 116 is of fixed wavelength.

In some embodiments, the laser emitter 106 may be tunable. For example, the wavelength of the second SM photonic input 116 may be adjusted as desired (e.g., via the control/power supply 106a); in some embodiments, the first SM photonic inputs 110a-n may share a common wavelength (e.g., $\lambda_1$) while the second SM photonic input 116 has a different wavelength (e.g., $\lambda_2$). The EOM 108 may modulate the second SM photonic input 116 according to the RF output 114 of the photodiode 104, generating the SM photonic output signal 118 (e.g., the optical-domain output of the photonic N:1 SM combiner 100).

In some embodiments, one or more of the components of the photonic N:1 SM combiner 100 may be embodied in a photonic integrated circuit (PIC) or some other optical waveguide structure or set of structures.

Figure 2:
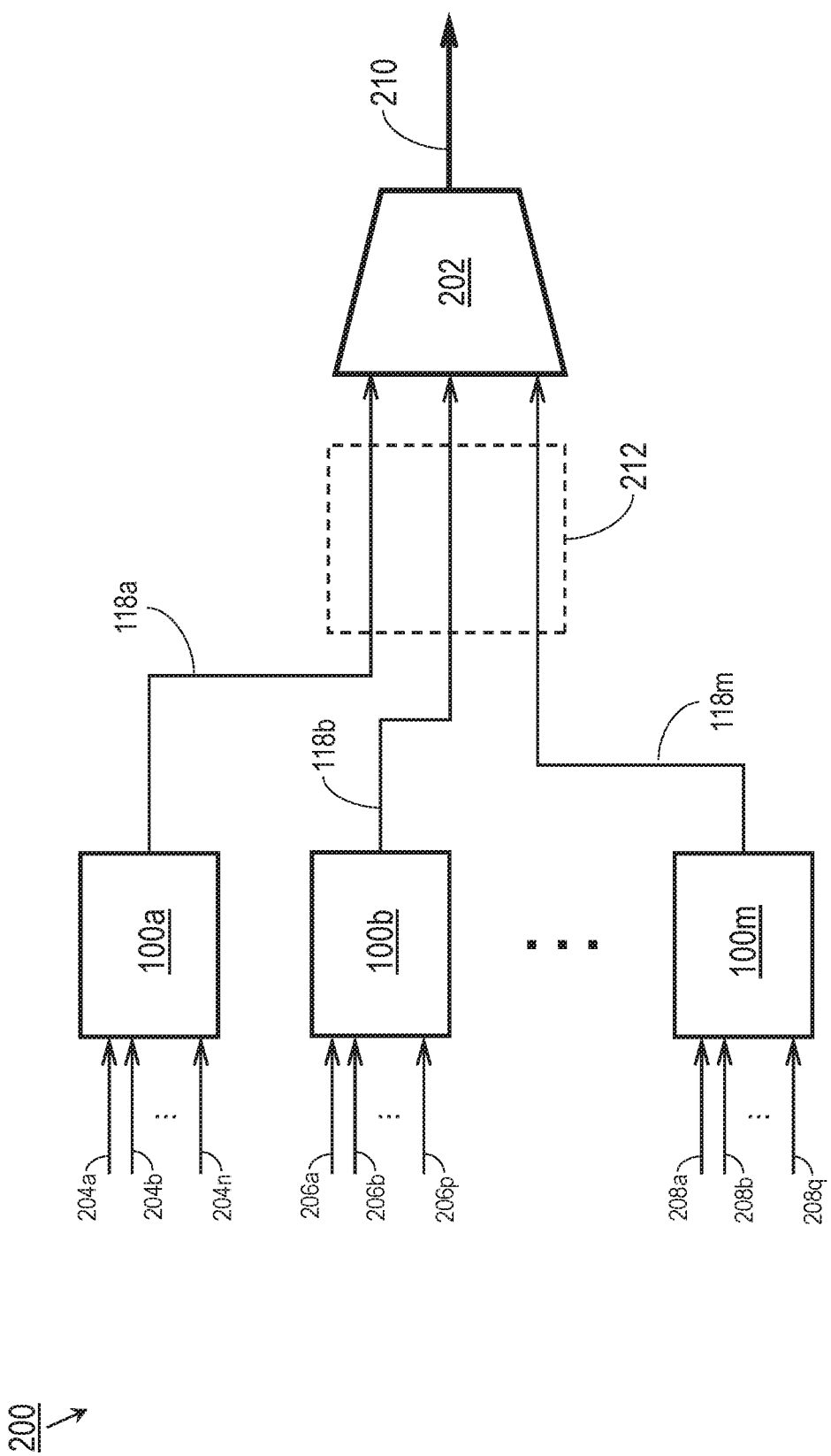
FIG. 2 is a block diagram illustrating a photonic SM combiner system incorporating the photonic SM combiner of FIG. 1.

Referring now to FIG. 2, the photonic N:1 SM combiner 100a may be implemented and may function similarly to the photonic N:1 SM combiner 100 of FIG. 1, except that the photonic N:1 SM combiner 100a may be incorporated (along with M−1 additional photonic SM combiners 100b . . . 100m) into a photonic SM combiner system 200 of M photonic X-to-one (X:1) SM combiners (e.g., many-to-one SM combiners, where X is a possible number of inputs to each of the photonic SM combiners 100a-m that may not be consistent among all of the M combiners) and an arrayed waveguide grating 202 (AWG) (e.g., or any other appropriate multiple-signal, multiple-wavelength multiplexer). For example, not all of the additional photonic SM combiners 100b-m may receive the same number of SM photonic inputs as the photonic N:1 SM combiner 100a (which receives N SM photonic inputs 204a . . . 204n) or as each other, as noted below.

In embodiments, each of the M photonic X:1 SM combiners 100a-m may receive a set of SM photonic inputs 204a-n, 206a . . . 206p, . . . 208a . . . 208q (e.g., the combiner 100a may receive N inputs, the combiner 100b may receive P inputs, and the combiner 100m may receive Q inputs, where N≠P≠Q) and generate therefrom a SM photonic output signal 118a . . . 118m. In some embodiments, each SM photonic output signal 118a-m may be associated with a different output wavelength $\lambda_1 \ldots \lambda_M$ (e.g., depending on the selected wavelength of the second SM photonic input (116, FIG. 1) generated by the laser emitter (106, FIG. 1) of each individual photonic X:1 SM combiner 100a-m. For example, each laser emitter 106 may be tunable or selected to a particular wavelength of a set of M discrete wavelengths). The AWG 202 may combine (e.g., multiplex) the SM photonic output signals 118a-m into a SM photonic output signal 210. Prior to combination by the AWG 202, each of the SM photonic output signals 118a-m may undergo additional photonic processing (212; e.g., modulation, delay, filtering, etc.).

Figure 3:
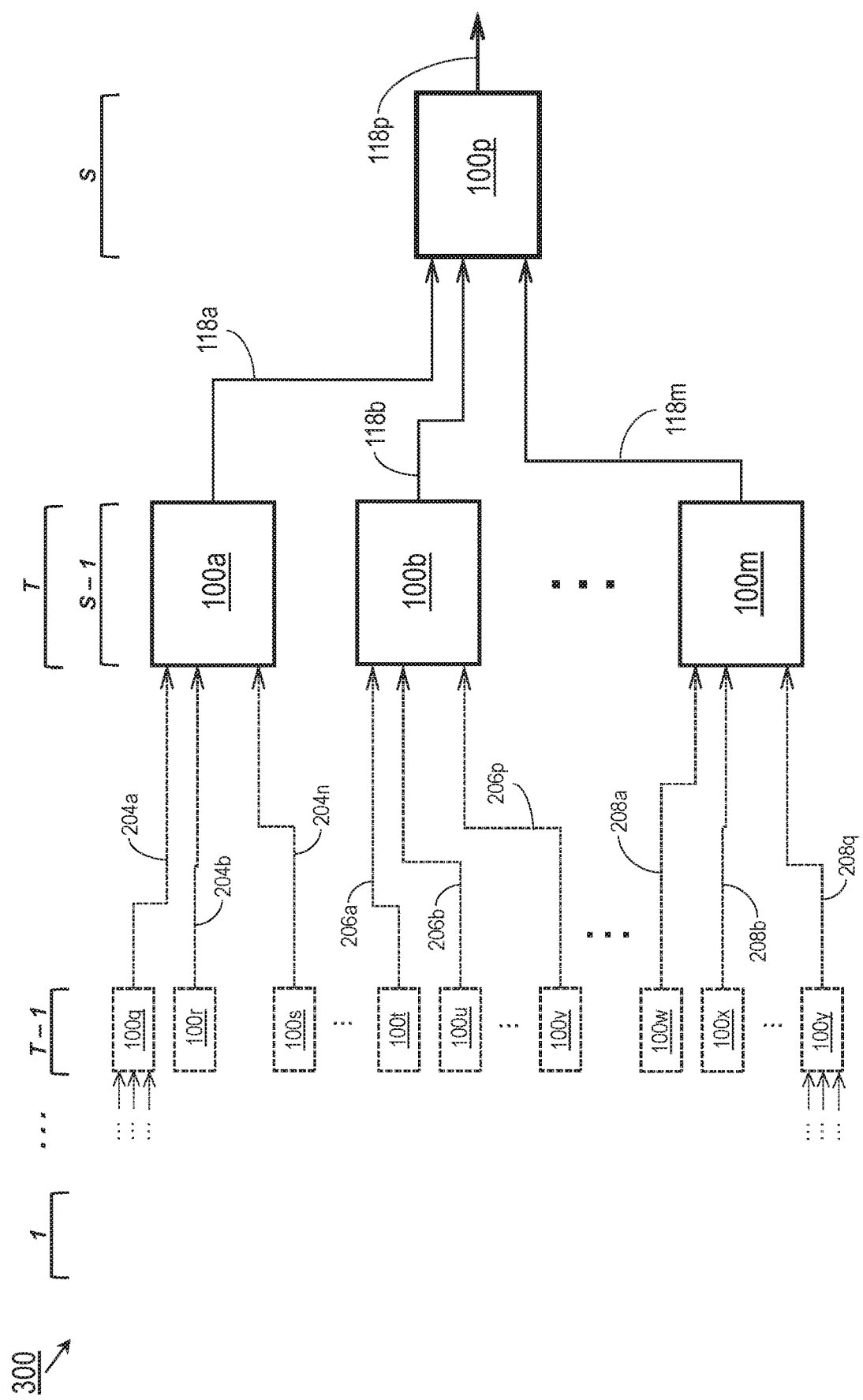
FIG. 3 is a flow diagram illustrating a cascading photonic SM combiner system incorporating the photonic SM combiner of FIG. 1.

Referring now to FIG. 3, the S-stage cascading photonic SM combiner system 300 may be implemented and may function similarly to the photonic SM combiner system 200 of FIG. 2, except that the S-stage cascading photonic SM combiner system 300 may comprise a cascading series of S combiner stages whereby the SM photonic outputs of each combiner of a combiner stage may be provided as SM photonic inputs to the next combiner stage, until at the final combiner stage S a single photonic M-to-one (M:1) SM combiner 100p produces the SM photonic output signal 118p as a system output.

In embodiments, the S-stage cascading photonic SM combiner system 300 includes a final combiner stage S (comprising the single photonic M:1 SM combiner 100p) optically connected (e.g., via optical waveguides or fibers as described above) to the penultimate combiner stage (S−1) (comprising the M photonic X:1 SM combiners 100a-m). Similarly, each intermediate combiner stage T (e.g., T=2, 3, . . . S−1) before the final combiner stage S (e.g., for T=1 to S−1) may be similarly optically connected to the immediately preceding stage (T−1) and receive the SM photonic outputs of the preceding stage as SM photonic inputs to the photonic lanterns (102, FIG. 1) of each photonic X:1 SM combiner 100a-m. For example, the M single-mode photonic output signals 118a-m of each photonic X:1 SM combiner 100a-m (e.g., at the penultimate combiner stage (S−1)) may be fed (e.g., via optical fibers or other like optical waveguides) into the photonic lantern (102, FIG. 1) of the final-stage (e.g., combiner stage S) photonic X:1 SM combiner 100p, which may generate a SM photonic output signal 118p based on the SM photonic inputs 118a-m similarly to the photonic N:1 SM combiner 100a and the photonic X:1 SM combiners 100b-m.

While the single-mode photonic outputs of the photonic X:1 SM combiners 100a-m may support additional optical processing (e.g., transport, delay, additional modulation or power combining) the single-mode output also enables the cascading of photonic combiners. In embodiments, the photonic X:1 SM combiners 100a-m may similarly be cascaded in such a way that each SM photonic input 204a-n, 206a-p, 208a-q to the M photonic X:1 SM combiners 100a-m (e.g., at combiner stage T or S−1) may itself be the SM photonic output signal of a prior stage of photonic X:1 SM combiners 100q . . . 100y (e.g., at combiner stage T−1). In this way, the cascading photonic SM combiner system 300 may be scaled up to handle potentially hundreds or thousands (e.g., 10,000=100×100) of SM photonic inputs.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A photonic N-to-one (N:1) single-mode (SM) combiner, comprising:
at least one photonic lantern configured to:
receive at least one plurality of N first SM photonic inputs via a plurality of waveguides, where N is an integer;
and
generate at least one multi-mode (MM) photonic output by combining the plurality of first SM photonic inputs;
at least one photodiode optically coupled to the photonic lantern, the photodiode configured to generate a radio frequency (RF) output based on the MM photonic output;
at least one laser emitter configured to generate at least one second SM photonic input;
and
at least one electro-optical modulator (EOM) optically coupled to the laser emitter and communicatively coupled to the photodiode, the EOM configured to generate a SM photonic output signal by modulating the second SM photonic input based on the RF output.

2. The photonic N:1 SM combiner of claim 1, wherein each SM photonic input of the plurality of first SM photonic inputs is associated with a common wavelength.

3. The photonic N:1 SM combiner of claim 1, wherein the at least one second SM photonic input is associated with a first wavelength of a plurality of possible wavelengths.

4. The photonic N:1 SM combiner of claim 3, wherein the plurality of first SM photonic inputs is associated with a common wavelength different from the first wavelength.

5. The photonic N:1 SM combiner of claim 1, wherein the photonic lantern includes a single-mode/multi-mode (SM/MM) combiner.

6. The photonic N:1 SM combiner of claim 1, wherein the plurality of waveguides includes at least one of a single-mode optical fiber, a few-mode optical fiber, and a photonic integrated circuit (PIC).

7. The photonic N:1 SM combiner of claim 1, wherein the photonic N:1 SM combiner is embodied in at least one photonic integrated circuit (PIC).

8. The photonic N:1 SM combiner of claim 1, further comprising:
at least one RF amplifier in communication with the photodiode, the RF amplifier configured to amplify the RF output;
wherein
the EOM is configured to generate the SM photonic output signal by modulating the second SM photonic input based on the amplified RF output.

9. The photonic N:1 SM combiner of claim 1, wherein the photonic N:1 SM combiner is a first photonic N:1 SM combiner and the SM photonic output signal is a first SM photonic output signal corresponding to a first wavelength of a set of W wavelengths, further comprising:
  a plurality of (W−1) second photonic X-to-one (X:1) SM combiners, each second photonic X:1 SM combiner configured to generate a second SM photonic output signal corresponding to a second wavelength of the set of W wavelengths, where W is an integer and X is one or more integers including N;
  the first photonic N:1 SM combiner and the plurality of (W−1) second photonic X:1 SM combiners comprising a set of W photonic X:1 SM combiners corresponding to the set of W wavelengths;
  and
  at least one W-to-one arrayed waveguide grating (AWG) optically coupled to the set of W photonic X:1 SM combiners, the AWG configured to combine the first SM photonic output signal and the plurality of (W−1) second SM photonic output signals into an SM photonic output signal.

10. The photonic N:1 SM combiner of claim 1, wherein the photonic N:1 SM combiner is a first photonic N:1 SM combiner and the SM photonic output signal is a first SM photonic output signal, further comprising:
  a plurality of N second photonic X-to-one (X:1) SM combiners optically coupled to the photonic lantern of the first photonic N:1 SM combiner via the plurality of waveguides, where X is one or more integers including N, each second photonic X:1 combiner configured to:
    receive a plurality of third SM photonic inputs via the photonic lantern;
    and
    generate at least one second SM photonic output signal based on the plurality of third SM photonic inputs, the plurality of N second SM photonic output signal corresponding to the plurality of N first SM photonic inputs.

11. An S-stage cascading photonic single-mode (SM) combiner assembly, comprising:
  a plurality of S combiner stages collectively configured to generate a SM photonic output signal via a photonic SM combiner of a final combiner stage S, where S is an integer;
  each combiner stage T, where T is an integer less than S, comprising at least one photonic SM combiner configured to receive a plurality of first SM photonic inputs from the combiner stage (T−1) and transmit a SM photonic output to the combiner stage (T+1), each photonic SM combiner comprising:
    a photonic lantern optically coupled to the combiner stage (S−1) or (T−1) by a plurality of waveguides and configured to:
      receive the plurality of first SM photonic inputs via the plurality of waveguides;
      and
      generate at least one multi-mode (MM) photonic output by combining the plurality of first SM photonic inputs;
    at least one first photodiode optically coupled to the photonic lantern, the photodiode configured to generate a radio frequency (RF) output based on the MM photonic output;
    a laser emitter configured to generate at least one second SM photonic input;
    and
    an electro-optical modulator (EOM) optically coupled to the laser emitter and communicatively coupled to the photodiode, the EOM configured to generate the SM photonic output by modulating the second SM photonic input based on the RF output.

12. The S-stage cascading photonic SM combiner assembly of claim 11, wherein the photonic SM combiner is an M-to-one photonic SM combiner configured to receive as the plurality of first SM photonic inputs a plurality of M SM photonic outputs from the combiner stage (S−1), where M is an integer.

13. The S-stage cascading photonic SM combiner assembly of claim 11, wherein:
  each combiner stage T, where T is an integer less than S, comprises a plurality of second photonic SM combiners,
    the photonic lantern of each second photonic SM combiner optically coupled to the combiner stage (T−1) by a plurality of first waveguides and configured to receive the plurality of first SM photonic inputs therefrom,
    and
    the EOM of each second photonic SM combiner optically coupled to the combiner stage (T+1) by a second waveguide, the combiner stage (T+1) configured to receive the SM photonic output from the EOM via the second waveguide as the first SM photonic input.

14. The S-stage cascading photonic SM combiner assembly of claim 11, wherein:
  each of the plurality of first SM photonic inputs is associated with a first wavelength; and
  the second SM photonic input is associated with at least one second wavelength.

15. The S-stage cascading photonic SM combiner assembly of claim 11, wherein the plurality of waveguides includes at least one of a single-mode optical fiber, a few-mode optical fiber, and a photonic integrated circuit (PIC).

* * * * *